United States Patent [19]
Chiu

[11] 4,174,368
[45] Nov. 13, 1979

[54] CURVED SAUSAGE CASINGS
[75] Inventor: Herman S. Chiu, Chicago, Ill.
[73] Assignee: Union Carbide Corporation, New York, N.Y.
[21] Appl. No.: 929,341
[22] Filed: Jul. 31, 1978
[51] Int. Cl.² .............................................. B29D 7/22
[52] U.S. Cl. .................... 264/561; 264/233; 264/339; 264/340; 264/343; 264/564; 264/573
[58] Field of Search ................ 264/95, 233, 340, 343, 264/339, 543, 555, 557, 561, 564, 573

[56] References Cited
U.S. PATENT DOCUMENTS

| | | | |
|---|---|---|---|
| 1,807,036 | 5/1931 | Hetzel | 264/233 |
| 1,961,268 | 6/1934 | Voss | 264/343 |
| 1,997,349 | 4/1935 | Schwalbe et al. | 264/95 |
| 2,136,566 | 11/1938 | Schnecko et al. | 264/95 |
| 2,925,621 | 2/1960 | Parth | 264/95 |
| 3,155,752 | 11/1964 | Riegler | 264/95 |

FOREIGN PATENT DOCUMENTS 2308065  9/1974  Fed. Rep. of Germany.
1406015  9/1975  United Kingdom.

*Primary Examiner*—Jeffery R. Thurlow
*Attorney, Agent, or Firm*—Fred Ian Nathanson

[57] ABSTRACT

A method of producing a curved sausage casing by treating a sausage casing before curving with caustic solution and neutralizing the casing while in the curved configuration.

9 Claims, 1 Drawing Figure

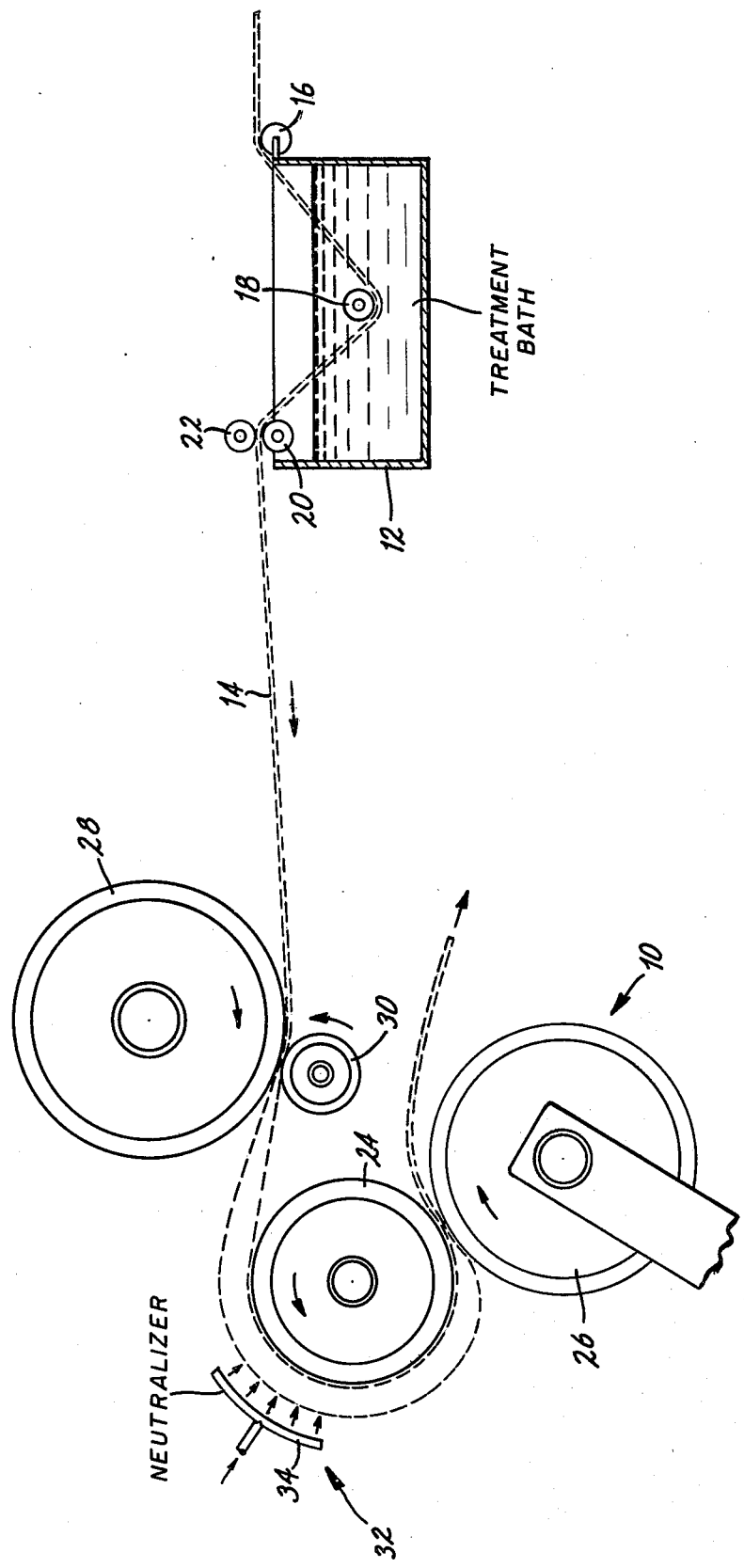

CURVED SAUSAGE CASINGS

The present invention relates to artificial sausage casings of regenerated cellulose. In a more specific aspect, the present invention relates to the manufacture of curved sausage casings.

Artificial sausage casings of regenerated cellulose have been known for some time. For certain types of end uses, the sausage casings have been produced with a rounded annular shape due to requirements of the trades people and craftsmen in the art. As a consequence, several techniques for producing artificial annular or curved casings have been proposed and adapted for commercial production. Merely as illustrative, according to one such technique, the regenerated cellulose casings manufactured in known manner are inflated with air when in wet gel-condition, and coiled around a heated cylinder. As a result, one side of the coiled casing, i.e. the one in contact with the hot surface of the cylinder, shrinks, which imparts a degree of stability to the spiral shaped casing. Subsequently, drying of the spirally shaped casing is completed in a tunnel oven. Thus, spirally coiled sausage casings are obtained which have proven to be quite useful to the manufacturers of annular rounded sausage casings.

In another known technique, a viscose solution is extruded through a ring-shaped extrusion nozzle into a spinning bath which exerts a coagulating action to the viscose. After achieving the necessary degree of stability, the coagulated tube thus obtained is inflated with air or an inert gas and, while still inflated, coiled around a cylinder in one or more spiral turns. Subsequently, the coagulated viscose is converted into regenerated cellulose. Finally, the tube of regenerated cellulose is subjected to the conventional cleaning, after-treatment and drying procedure.

It is a principal object of the present invention to provide an alternate method for producing a curved or annular shaped sausage casing.

Another object of the invention is to provide a method for producing curved sausage casings which retain their shape upon rewetting and inflation.

Still another object of the invention is to provide a method for producing a curved sausage casing of regenerated cellulose which method is efficient and economically attractive.

These and other objects of the invention will become apparent from the following description taken in conjunction with the accompanying drawing in which:

FIG. 1 schematically illustrates a vertical section of an apparatus adapted for performing the method of the invention.

Broadly contemplated, the present invention provides a method of producing curved regenerated cellulose casings which comprises the steps of (a) passing a regenerated cellulose tubular casing gel stock in contact with a caustic solution for a time and at a concentration sufficient to plasticize said casing gel stock; (b) inflating the plasticized casing with an inert fluid; (c) passing said inflated plasticized casing around and in contact with a cylindrical surface to conform the shape of said plasticized casing to the shape of said cylindrical surface; (d) contacting said plasticized inflated casing with a neutralizing agent while said plasticized casing is disposed on said cylindrical surface, said neutralizing agent being employed in an amount and for a time sufficient to neutralize said caustic solution impregnated in said casing; (e) removing said neutralized casing from said cylindrical surface and thereafter; (f) washing, plasticizing and drying said casing.

For a clearer understanding of the invention, reference is made to the accompanying drawing wherein reference numeral 10 generally denotes an apparatus suitable for practicing the method of the instant invention. The apparatus includes a treatment vessel 12 which is adapted to accommodate the caustic solution utilized to plasticize the regenerated cellulosic tubing 14. The regenerated cellulosic tubing prior to treatment is utilized in the form in which it is produced, i.e. after formation and before drying and while it is still in the wet state. Alternatively, a dry cellulosic tubing can be utilized provided it is re-wet to make it pliable for the subsequent caustic treatment. As is shown in the drawing associated with the treatment vessel are a series of rollers 16, 18, 20 and 22 which are positioned in a manner such as to guide the cellulosic tubing into and through the treatment vessel 12. In order to accomplish this, roller 16 is positioned over and above the entry end of vessel 12 whereas the roller 18 is positioned interiorly of the vessel below the liquid level of the caustic solution. Thus during operation, the cellulosic tubing 14 travels a path over roller 16 thence under roller 18, in contact with the caustic solution and is thereafter directed out of the treatment bath between rollers 20 and 22 disposed above and exteriorly of vessel 12 which also serves to squeeze excess caustic solution from the cellulosic tubing. Positioned downstream of the treatment vessel 12 is cylindrical drum or cylinder 24 which can be of any conventional type commonly employed in the art for producing curved sausage casings, and which is adapted to rotate on its axis in a direction away from the vessel 14, i.e. as in the present case, in a counter-clockwise direction.

According to the method of the invention, the cellulosic tubing 14, after it has been plasticized with caustic solution, is inflated with an inert fluid and made to travel a path on the surface of cylinder 24.

Thus, as shown, as the plasticized cellulosic tubing 14 leaves the rollers 20 and 22, it is directed between top squeeze roll 28 (which can be made vertically movable by means of an air cylinder, not shown) and upper roll 30. Lower roller 26 can also be vertically movable by means of an air cylinder (not shown). It is preferred however that top squeeze roll 28 be permanently urged against roll 30 and that lower roller 26 be vertically movable.

Prior to start-up cellulosic tube 14 is passed through rollers 28 and 30 which are in contacting relation, and around cylinder 24. Lower roller 26 is urged away from cylinder 24 and air is introduced by conventional manner into the open leading end of tube 14. Lower roller 26 is then urged against cylinder 24 and a trapped air bubble in the cellulosic casing is formed between the nip of rollers 28, 30 and 24, 26.

As the inflated plasticized casing passes around the surface of cylinder 24 and in contact therewith, the shape of the plasticized casing is conformed to the shape of the cylindrical surface. In order to "set" the shape of the casing, it is necessary to neutralize the caustic solution in the casing. Thus, referring to the drawing it will be seen that disposed above the inflated casing 14 intermediate lower roller 26 and top squeeze roller 28 is a feed device 32 which is adapted to emit a neutralizing solution in the form of droplets against the surface of the cellulosic tubing 14 and cylinder 24. It is not necessary to treat the cellulosic tubing 14 with the neutralizing solution in any special direction or even in all directions. It suffices, for example, if the neutralizing solution is discharged through holes, in pipe 34 disposed above the cellulosic tubing 14. The neutralizing solution thus becomes distributed evenly around the entire periphery of cellulosic tubing 14. After the tubular casing is neutralized, it discharges from the surface of cylinder 24 and lower roller 26 where it is subjected to the usual washing procedures. For this reason, the tube, which at this stage is deflated and therefore in flat state, is passed in, through and out of the various baths necessary for the treatment by the aid of conveyor rollers (not shown), as is the case with non-shaped tubes. Thereafter, the tube is dried as usual. Previous to drying, however, the tube is advantageously impregnated in known manner with a softening agent, such as glycerine. The cellulosic tubing is thereafter directed and coiled around a conventional drying cylinder for drying, and thereafter coiled on a spool in flat state.

In general, the materials contemplated for treatment according to the present invention include regenerated cellulose which may be regenerated from viscose, cuprammonium solutions of cellulose, or formed by deesterifying cellulose esters, or deetherifying cellulose ethers; also hydrophilic cellulose derivatives such as cellulose esters, cellulose ethers, cellulose ether-esters and cellulose ether-xanthates.

The tubular casing, prior to treatment, can be formed according to conventional procedures such as by extruding a solution of selected material into the shape of a tubing, coagulating, regenerating and purifying the material of the tubing, or alternatively the tubular casing can be formed by dipping a mandrel of suitable shape to form either a cap or a band into a solution of the desired coagulable material, and coagulating, regenerating and purifying the material in accordance with well known practices which within themselves form no part of the present invention.

The caustic solution utilized to plasticize the casing can include sodium hydroxide, potassium hydroxide and lithium hydroxide. Other cellulosic swelling agents such as liquid ammonia and potassium thiocyanate can also be utilized.

The concentration of the caustic solution utilized in the treatment depends in part upon the types of materials utilized, the temperature of treatment and other variables.

As will be evident, concentrations of caustic solutions which would deteriorate or destroy the cellulose should not be utilized. As an illustration, when treatment is conducted at room temperature, the caustic concentrations can be within the range of about 15% to about 30%. At a temperature of about $-10°$ C. the concentration of caustic solution can be about 7%. Thus in general, the solution utilized in the method can vary from about 7% to about 30% and preferably from about 15% to about 25%. Since temperatures substantially in excess of room temperature could have detrimental effects, the use of elevated temperatures should be avoided.

Suitable neutralizing agents for accomplishing the neutralization include solutions of sulfuric acid, hydrochloric acid, nitric acid, acetic acid and citric acid.

The concentration of the acid solution utilized in the neutralization also depends in part upon the types of materials utilized, the temperature of treatment and other variables. As will be evident, concentrations of acid solutions which could deteriorate or destroy the cellulose should not be utilized. As an illustration, when treatment is conducted at room temperature, the acid concentrations can be within the range of about 5% to about 20%, preferably about 15%. Since temperatures substantially in excess of room temperatures could have detrimental effects, the use of elevated temperatures should also be avoided.

The inert fluid which can be utilized to inflate the cellulosic tubing 14 is of the type commonly employed in the art with air being the preferred fluid. Moreover, the inner pressures of the inflated tubing are those commonly dealt with in the art as is the mil thickness of the cellulosic tubing.

Since the reactions which take place, i.e. the plasticization and neutralization reactions, are quite rapid, there is no critical limitations as to the speed of treatments or the speed of travel of the cellulosic casing through the apparatus. As a general rule, caustic contact time can range from about 2 to about 5 seconds of liquid contact (caustic solution) and from about 10 to about 15 seconds of air travel, i.e. from the treatment vessel 12 to contact with the neutralization agent.

Insofar as the site of neutralization, the neutralizing agent should be applied while the plasticized cellulosic tubing is in the curved or deformed condition and prior to its discharge from the cylinder 24.

The following examples are included in order to illustrate the new process by different ways of carrying it out. It is to be understood that it is not intended to limit the scope of the present invention to the embodiments described in the examples, but that the invention is capable of many modifications. Changes, therefore, in the arrangement may be made without departing from the spirit and scope of the present invention. The drawing serves to illustrate the following examples.

EXAMPLE 1

A cellulosic tubing produced by conventional means is introduced while in the wet state into treatment vessel 12 which contains about 25% sodium hydroxide solution and allowed about 10 seconds air travel before reaching top squeeze roll 28. The tube is passed around cylinder 24 and in between cylinder 24 and roller 26 which at start-up is away from the surface of cylinder 24. The tube is then inflated with air and roller 26 is then urged against the surface of cylinder 24 to form a trapped air bubble between the two pinch points, i.e. rollers 30, 28 and roller 26 and cylinder 24. The tube thus inflated with air is thereafter subjected to a neutralizing agent, i.e. a 10% solution of sulfuric acid which is showered onto the deformed caustic plasticized casing curved around cylinder 24 through pipe 32. In this manner the plastic tubing is now rendered "unplasticized" and set. The curved cellulosic tubing 14 is then sent to a conventional washing, glycerination and drying procedure. The dry curved sausage casings are then rewetted and it is noted that they retain their curved shape.

EXAMPLE 2

The procedure of Example 1 is repeated except that the treatment vessel contains 15% sodium hydroxide. The treated tubular casing retains a permanent curvature when stuffed with meat product.

EXAMPLE 3

The procedure of Example 1 is repeated except that the treatment vessel contains 5% sodium hydroxide solution. The resulted casing does not show satisfactory permanent deformation, because the caustic solution at this concentration does not give sufficient swelling to the cellulose.

EXAMPLE 4

The procedure of Example 1 is repeated except that the neutralizing agent is 15% hydrochloric acid. The treated tubular casing retains a permanent curvature when stuffed with meat product.

EXAMPLE 5

The procedure of Example 1 is repeated except that the treatment vessel contains 15% lithium hydroxide. The treated tubular casing retains a permanent curvature when stuffed with meat product.

EXAMPLE 6

The procedure of Example 1 is repeated except that the treatment vessel contains 25% potassium hydroxide. The treated tubular casing retains a permanent curvature when stuffed with meat product.

While the above describes a continuous method for producing a curved sausage casing, it will be obvious that the treatment described herein can be adapted to a batch operation. For example, a cellulosic casing gel stock can be treated with about 25% NaOH solution. Excess solution can be squeezed off, and after about 10 seconds inflated and passed around a cylindrical surface corresponding to the desired shape of the sausage casing. The deformed caustic plasticized casing can thereafter be treated with the neutralizing agent whereby the casing is rendered "unplasticized" and set. The casing is thereafter washed thoroughly, glycerinated and dried in conventional manner to retain the curvature.

Moreover, while the method has been described with reference to a single winding of the cellulosic casing around the cylindrical surface, it will be apparent that the cellulosic casing can be coiled continuously around the cylinder in spiral turns.

What is claimed is:

1. A method of producing curved regenerated cellulose casings which comprises the steps of (a) passing a regenerated cellulose tubular casing in contact with a cellulosic swelling solution for a time and at a concentration sufficient to plasticize said casing; (b) inflating the plasticized casing with an inert fluid; (c) passing said inflated plasticized casing around and in contact with a cylindrical surface to conform the shape of said plasticized casing to the shape of said cylindrical surface; (d) contacting said plasticized inflated casing with a neutralizing agent while said plasticized casing is disposed on said cylindrical surface, said neutralizing agent being employed in an amount and for a time sufficient to neutralize said cellulosic swelling solution impregnated in said casing; (e) removing said neutralized casing from said cylindrical surface and thereafter; (f) washing, plasticizing and drying said casing.

2. A method according to claim 1 wherein said cellulosic swelling solution is a caustic solution.

3. A method according to claim 2 wherein the caustic solution is selected from the group consisting of sodium hydroxide, potassium hydroxide and lithium hydroxide.

4. A method according to claim 1 wherein said cellulosic swelling solution is selected from the group consisting of liquid ammonia and potassium thiocyanate.

5. A method according to claim 2 wherein the concentration of said caustic solution is in a range of about 7% to about 30%.

6. A method according to claim 2 wherein the concentration of caustic solution is in the range of about 15% to about 25%.

7. A method according to claim 1 wherein the neutralizing agent is selected from the group consisting of sulfuric acid, hydrochloric acid, nitric acid, acetic acid and citric acid.

8. A method according to claim 7 wherein the concentration of said neutralizing agent is from about 5% to about 20%.

9. A method according to claim 7 wherein the concentration of neutralizing agent is about 15%.

* * * * *